United States Patent

[11] 3,598,335

| [72] | Inventor | Gerald Seeger<br>Farmington, Mich. |
|---|---|---|
| [21] | Appl. No. | 23,412 |
| [22] | Filed | Mar. 27, 1970 |
| [45] | Patented | Aug. 10, 1971 |
| [73] | Assignee | General Motors Corporation<br>Detroit, Mich. |

[54] SEATBELT RETRACTOR
7 Claims, 11 Drawing Figs.

[52] U.S. Cl. ................................................. 242/107.2,
242/107.4, 242/107.7
[51] Int. Cl. ...................................................... B65h 75/48
[50] Field of Search .......................................... 242/107 R,
107 SB, 107.2, 107.4, 107.5, 107.6, 107.7;
297/388, 389; 280/150 SB

[56] References Cited
UNITED STATES PATENTS

| 3,206,137 | 9/1965 | Snyderman | 242/107.7 X |
| 3,286,946 | 11/1966 | Board et al. | 297/388 X |
| 3,389,874 | 6/1968 | Van Noord | 242/107.2 |
| 3,425,645 | 2/1969 | Board et al. | 242/107.2 |
| 3,467,337 | 9/1969 | Putman | 242/107.4 |
| 3,486,792 | 12/1969 | Stoffel | 242/107.2 X |
| 3,494,571 | 2/1970 | Stoffel | 242/107.2 |
| 3,504,867 | 4/1970 | Stevenson | 242/107.4 X |

*Primary Examiner*—Stanley N. Gilreath
*Assistant Examiner*—Werner H. Schroeder
*Attorneys*—W. E. Finken and Herbert Furman ABSTRACT: An automatic retractor of the self-locking type includes a pawl movable into and out of engagement with ratchet shoulders on the end plate of the reel to selectively lock and unlock the reel against movement in an extending direction. A slide is engageable by the pawl each time that the pawl is engaged with the ratchet shoulders to control the rotation of a lobed cam wheel. The cam wheel is engageable with successive lobes of a locking member to move the locking member from either clamped or unclamped position toward the other position. An overcenter spring controls the final movement of the clamping member from a point intermediate either position to the other.

INVENTOR
Gerald Seeger
BY
Herbert Furman
ATTORNEY

INVENTOR
Gerald Seeger
BY
Herbert Furman
ATTORNEY 3,598,335

1

SEATBELT RETRACTOR

This invention relates to seatbelt retractors and more particularly to seatbelt retractors of the automatic locking type.

Seatbelt retractors of the automatic locking type generally include a belt reel which is continuously biased in a retracting direction, and a ratchet and pawl arrangement which is operable, when engaged, to hold the reel against movement in an extending direction and thereby hold the belt against extension. Even though the belt may be held against extension, it is still urged at all times in a retracting direction by the biasing of the reel.

Generally in such retractors, the end plates of the reel are formed as circular ratchets having peripherally spaced radial teeth aligned axially of the reel. A pawl is mounted on the frame for movement into and out of engagement with the teeth of the ratchets. In order for the pawl to engage the ratchet teeth, the belt must first be extended a predetermined distance from a fully retracted position, then at least slightly retracted, and then slightly extended.

Due to movement of a belted passenger inward of the seat, it has been noted that it is possible for the reel to move in a retracting direction through a sufficient arc such that the pawl moves out of engagement with a particular pair of ratchet teeth in a retracting direction. The belt thus tightens about the occupant and can make the occupant uncomfortable.

The belt retractor of this invention is of the automatic locking type but obviates this disadvantage of such retractors by having a releasable belt-locking means for selectively locking the belt against retraction when the ratchets and pawl are engaged. Thus, once a vehicle passenger has belted himself within the vehicle, movement of the reel in a retracting direction under the normal bias thereof can be effectively blocked if so desired.

The belt-locking means of this invention is actuated by a slight extension of the belt when the ratchets and pawl are engaged to move a pair of clamping members relative to each other between clamped and unclamped positions to thereby either clamp the belt to the retractor or release the belt for movement relative to the retractor. Once the belt 22 has been extended from an initial fully retracted position, then at least slightly retracted, each subsequent slight extension of the belt will move the clamping members relative to each other between their clamped and unclamped positions. Thus if the occupant has belted himself into the seat and has actuated the locking means of this invention to clamp the belt against retraction and then changes his mind or wishes to leave the vehicle, a subsequent slight extension of the belt will release the locking means.

The primary feature of this invention is that it provides an improved retractor of the automatic locking type having selectively operable means for releasably locking the belt against movement in a retracting direction when the reel is locked against movement in an extending direction.

These and other features of the retractor of this invention will be readily apparent from the following specification and drawings wherein.

2

Figure 3:
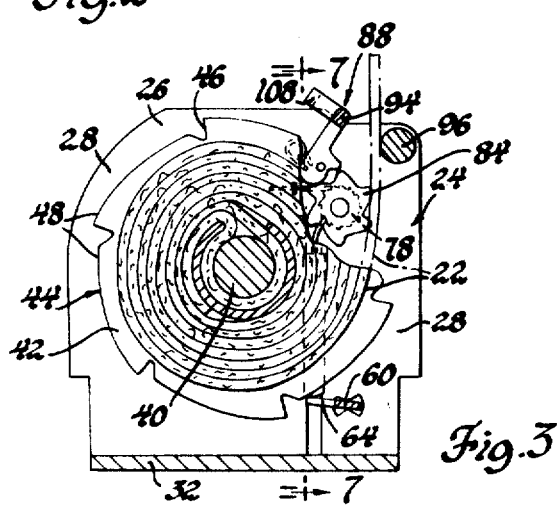
FIG. 3 is a view taken generally along the plane indicated by line 3—3 of FIG. 2 and showing the belt-locking means in unlocked position.
Figure 7:
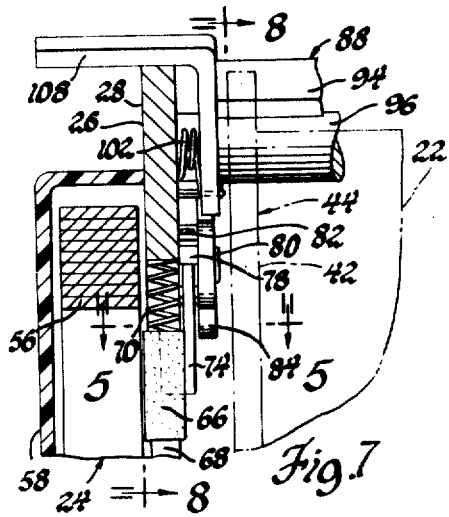

FIG. 7 is an enlarged view taken generally along the plane indicated by line 7—7 of FIG. 3.

Figure 8:
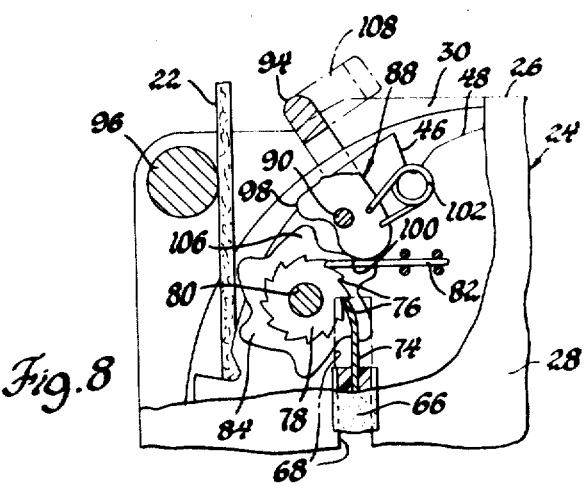

FIG. 8 is a view taken generally along the plane indicated by line 8—8 of FIG. 7.

Figure 4:
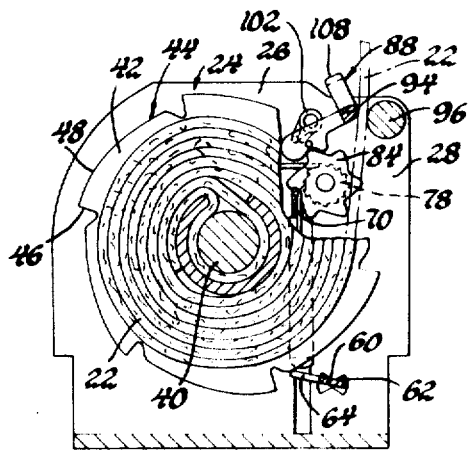
FIG. 4 is a view generally the same as FIG. 3 but showing the belt-locking means in locked position.
Figure 9:
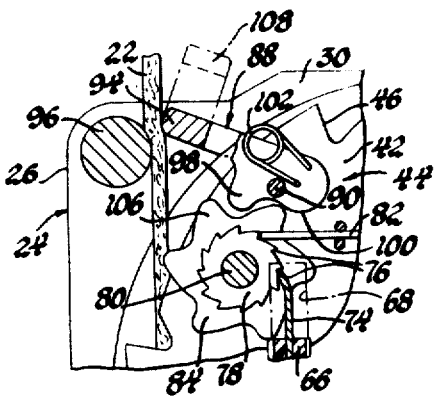

FIG. 9 is an enlarged view of a portion of FIG. 4.

Figure 6:
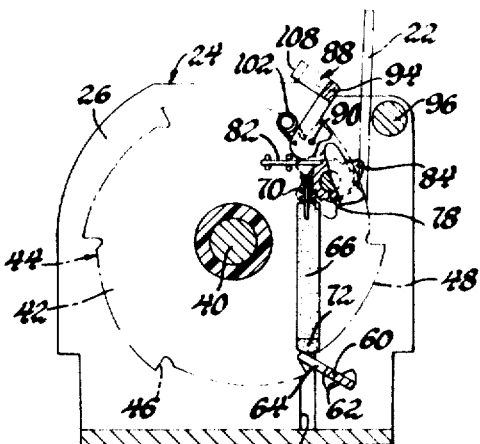
FIG. 6 is a view taken generally along the plane indicated by line 6—6 of FIG. 2.
Figure 10:
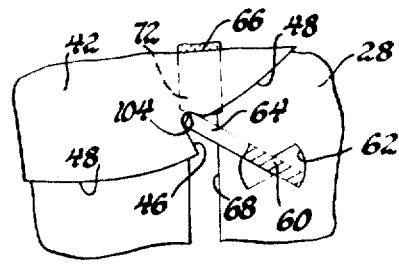

FIG. 10 is an enlarged view of a portion of FIG. 6.

Figure 11:
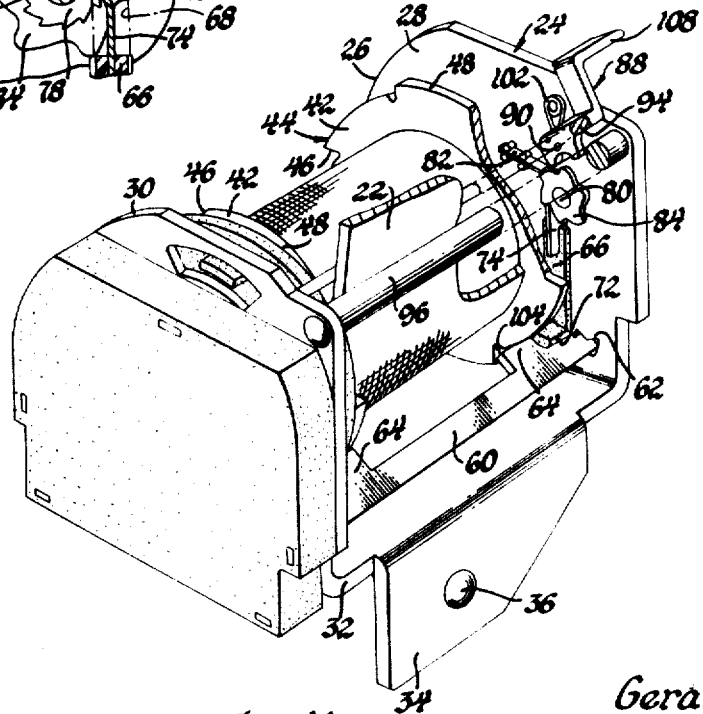

FIG. 11 is a partially broken away perspective view.

Figure 1:
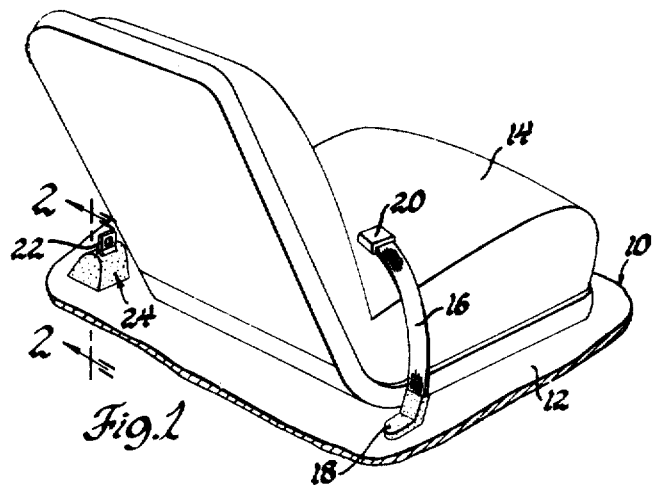
FIG. 1 is a partial perspective view of the interior of a vehicle body having a seat mounted thereon a lap belt assembly for belting a passenger within the seat, with the outboard lap belt being mounted on the body by a retractor according to this invention.

Referring now particularly to FIG. 1 of the drawings, a vehicle body designated generally 10 includes a floor pan 12 on which is conventionally mounted a conventional bucket-type vehicle seat 14. A lap belt assembly is provided for the occupant of the seat and includes an inboard belt 16 conventional anchored at one end 18 to the floor pan 12 and provided with a conventional buckle 20 at its free end.

The outboard belt 22 is mounted on the floor pan 12 by a retractor 24 according to this invention and includes a conventional D-ring at its free end which is cooperable with the buckle 20 when the belt 22 is extended to form a lap belt assembly for the occupant of seat 14. Since the retractor 24 is of the automatic locking type, no adjustment of the lap belt is required for varying-size occupants.

Generally the retractor 24 is the same as that shown and described in copending application Ser. No. 1,197, filed Jan. 7, 1970, Seat Belt Retractor, George E. Frost, and assigned to the assignee of this invention. Accordingly, only those details of the retractor necessary to an understanding of the belt-locking means of this invention will be particularly described. Reference may be had to the aforenoted Frost application for other details and a description of the operation of the retractor 24, particularly the ratchet and pawl arrangement.

Figure 2:
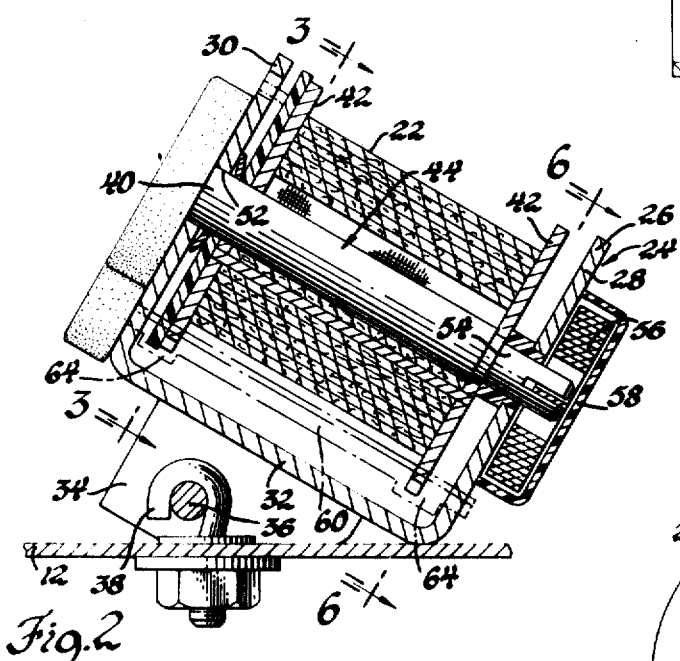
FIG. 2 is an enlarged sectional view taken generally along the plane indicated by line 2—2 of FIG. 1.

As best shown in FIGS. 2 and 11 of the drawings, the retractor 24 includes a generally channel-shaped housing 26 having spaced end walls 28 and 30 which are interconnected by a base wall 32 provided with integral depending aperture flanges 34. The flanges 34 are interconnected by a pin 36. As shown in FIG. 2, a hook member 38 bolted to the floor pan 12 engages the pin 36 to thereby mount the housing 26 on the floor pan 12. It will be noted that the flanges 34 are partially cut away to fix the angular position of the retractor with respect to the floor pan 12 and in turn fix the belt angle when the belt 22 is extended from the retractor.

A shaft 40 extends through and is secured to like aperture ratchet plates 42 to provide a reel 44. The peripheries of the plates 42 to provide a reel 44. The peripheries of the plates are provided with a number of equally spaced axially aligned teeth or radial shoulders 46. The shoulders of each plate are interconnected by peripheral cam surfaces 48. The belt 22 is fully wound on reel 44 when it is fully retracted and is unwound from the reel when it is extended. The looped inner end of the belt 22 is secured to the shaft 40 to secure the belt to the reel and a D-ring is secured to the outer looped end of the belt.

The reel 44 is rotatably mounted on the housing 26 by journaling one end of the shaft 40 within an aperture 52, FIG. 2, in end wall 30 and journaling the reduced diameter slotted other end 54 of the shaft within a bushing opening in the other end wall 28. A conventional clock spring 56 has its outer spiral suitably anchored to the wall 28 and its inner spiral received within the slotted end 54 of the shaft 40 to thereby continually bias the reel 44 in a belt-retracting direction, as viewed in FIGS. 3 through 5 and 10, or counterclockwise, as viewed in FIGS. 7 and 8. A conventional cover 58 secured to wall 28 covers the clock spring.

From the foregoing description, it can be seen that when the D-ring on the outer end of the belt 22 is manually grasped by an occupant of the seat 14 and pulled, the reel 44 will be rotated in a belt-extending direction against the action of the spring 56.

As best shown in FIG. 10, a flat pawl 60 extends between the walls 28 and 30 and is rotatably received within hourglass-shaped openings 62 in the walls. The pawl 60 includes lateral extensions 64 which extend toward the ratchet plates 42 and are engageable with any respective pair of shoulders 46 thereof to block movement of the reel 44 in a belt-extending direction.

As fully described in the aforenoted Frost application, the pawl 60 is continuously spring biased toward the ratchet plates 42, and cooperating first and second sensor arrangements control the engagement of the pawl extensions 64 with the ratchet plate shoulders 46. Generally these sensors block movement of the pawl extensions into engagement with the ratchet plate shoulders unless the belt 22 is first pulled out or extended a predetermined distance from a fully retracted position, then at least slightly retracted, and then slightly pulled out or extended.

Figure 5:
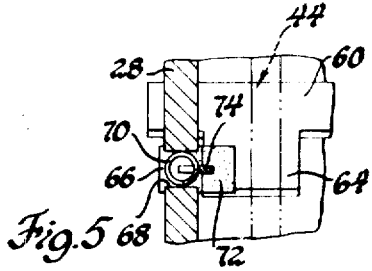
FIG. 5 is a view taken generally along the plane indicated by line 5—5 of FIG. 7.

As shown in FIGS. 5 and 11 of the drawings, a generally H-shaped member or slide 66 is slidably mounted within a slot 68 of the wall 28 of housing 26. A coil compression spring 70 seats between the upper end of the slide 66 and the upper wall of slot 68, as shown best in FIG. 7, to continually bias the member 66 downwardly within the slot 68 and hold the lower end thereof in engagement with the lower end of slot 68. The lower end of the slide 66 includes a lateral foot or extension 72 which is engageable with one of the extensions 64 of the pawl 60 as will be described. The foot 72 may have an arcuate lower periphery to permit movement of the foot 72 and pawl extension 64 relative to each other without interference.

Secured to the slide 66 is a flat pawl 74 having an upper arcuate terminal or free end engageable with successive teeth 76 of a ratchet wheel or plate 78, FIG. 8. The free end of the pawl 74 also engages the peripheral cam surface between successive pairs of teeth 76 to thereby block any clockwise movement of the plate 78 and likewise function to locate the plate 78 in selected rotative positions relative to the end wall 28. Plate 78 is fixed to a shaft 80 which is rotatably mounted on the end wall 28 of frame 26. A leaf spring 82, staked to wall 28, is engageable with successive teeth 76 of the plate 78 to permit movement of the plate in only one direction, counterclockwise as viewed in FIGS. 8 and 9, or clockwise as viewed in FIG. 11. The engagement of the end of the leaf spring with a peripheral cam surface between each successive pair of teeth 76 also locates the rotative position of the plate 78 with respect to the wall 28. Located outboard of the plate 78 with respect to wall 28 is a star or cam wheel 84 which is also fixed to the shaft 80 for concurrent movement with the plate 78.

A generally U-shaped clamping member 88 has its legs pivoted at 90 on wall 28 at an aligned pivot on wall 30. The clamping member includes a clamping bar 94 which interconnects the legs thereof. Member 88 is movable between an unclamped position wherein bar 94 is out of clamping engagement with the belt 22, as shown in FIGS. 3, 6, 8 and 10, to permit free movement of the belt in both extending and retracting directions, and a clamped position wherein bar 94 is in clamping engagement with the belt 22, as shown in FIGS. 6 and 9, to hold the belt against movement in a retracting direction but permit movement of the belt in an extending direction. When the clamping member is in the clamping position as shown in FIG. 9, bar 94 squeezes a portion of the belt against a cooperating clamping bar 96 which extends between and is secured to the walls 28 and 30 of the frame 26. The one leg of the clamping member 88 which is located adjacent and pivoted to wall 28 includes a lower multilobed surface having cam lobes 98 and 100. An overcenter-type coil torsion spring 102 extends between the one leg of member 88 and the wall 28 to thereby selectively and alternately bias the clamping member 88 to either its unclamped position, as shown in FIG. 8, wherein the clamping member is located against further movement in a clockwise direction by engagement of lobe 100 with a lobe of wheel 84 or to its clamped position, as shown in FIG. 9.

When an occupant of seat 14 has extended belt 22 from a fully retracted position, FIG. 1, and then buckled this belt to the belt 16 to form a lap belt assembly, he can then release the belt 22. The belt 22 will then be subsequently retracted or wound upon the reel 44 by the action of the spring 56.

As will be apparent from the foregoing description and reference to the aforenoted Frost application, during the initial extension of the belt from the fully retracted position and the subsequent retraction of the belt by the action of the spring 56, the pawl 60 will be located as shown in FIG. 3 with the extensions 64 out of engagement with the shoulders 46 of the ratchet plates 42. As soon as the belt 22 has been retracted a sufficient amount by spring 56 to tighten the lap belt assembly about the occupant, the occupant thereupon grasps the belt 22 and slightly extends this belt. During this slight extension, the pawl 60 is release for movement within openings 62 toward the periphery of the end plates 42 and also for engagement of the pawl extensions 64 with a pair of cam surfaces 48 and then the next successive pair of shoulders 46 in a retracting direction to lock the reel against further extension.

As shown in FIGS. 3 and 11, when the pawl 60 is located with its extensions 64 out of engagement with shoulder 46, the foot 72 of member 66 is located in spaced relationship to the one extension 64 adjacent wall 28. Each peripheral cam surface 48 is joined to a respective shoulder 46 by a groove or notch 104. The foot 72 extends slightly below the cam surface 48 when the pawl is located as shown in FIG. 3. When the occupant slightly extends the belt 22 after it has been retracted, the extensions 64 of the pawl move into engagement with a pair of surfaces 48 and then a pair of shoulders 46, as previously mentioned. The extensions then move radially inwardly of the teeth and into the pair of grooves 104 located adjacent the engaged shoulders 46. As the pawl extensions 64 move into the grooves 104, the one pawl extension adjacent wall 28 engages the foot 72 to slightly shift the slide 66 upwardly as shown in FIGS. 6 and 10. It should be noted that foot 72 also extends slightly across the one groove 104 as the one pawl extension moves into this one groove to ensure engagement of the foot and this one extension and the subsequent upward movement of slide 66. The occupant then releases belt 22 and the one extension 64 and groove 104 normally assume the position shown in FIG. 4.

As the slide 66 shifts slightly upwardly upon engagement of the one extension 64 with foot 72, the pawl 74 rotates the plate 78 in a counterclockwise direction, as viewed in FIGS. 8 and 9, to ratchet the leaf spring 82 into engagement with the next successive tooth 76. When the occupant release belt 22 and the one pawl extension 64 moves out of a respective groove 104 from its FIG. 10 position to its FIG. 4 position, spring 70 shifts slide 66 downwardly and pawl 74 ratchets into engagement with the next successive tooth 76. Thus the plate 78 rotates through a predetermined arc. The wheel 84 likewise rotates with the plate 78 and the engagement of the one lobe 106, FIG. 8, of the wheel 84 with the lobe 100 of the one leg of the clamping member 88 rotates the clamping member counterclockwise from its FIG. 8 position toward its FIG. 9 position, so that the spring 102 moves overcenter and rotates the clamping member to its clamped position of FIG. 9. It can be seen from a comparison of FIGS. 8 and 9 that the one lobe 106 of wheel 84 moves past the lobe 100 of the clamping member 88 as the clamping member moves to clamped position and moves into the space between this lobe and lobe 98.

When the bar 94 of member 88 clamps the belt 22 against bar 96, the belt 22 is locked against movement in a retracting direction and any such movement only tends to increase the clamping force applied by the bar 94 clamping member to the belt 22. However, the clamping member 88 permits movement of the belt an extending direction at all times. Such movement is, of course, limited by the engagement of the lateral extensions 64 of pawl 60 with the shoulders 46 of the plates 42.

From the foregoing description, it can be seen that each time that the belt 22 is slightly pulled outwardly when the pawl 60 is released for engagement with the shoulders 46, the slight upward movement of the slide 66 by the one pawl extension as it moves within a respective groove 104 will ratchet the plate 78 and the wheel 84 past the leaf spring 82 and also past the pawl 74 to move the clamping member 88 from the unclamped position of FIG. 8 to the clamped position of FIG. 9.

Assume now that the operator has unbuckled the inboard lap belt 16 from the outboard lap belt 22 and desires to retract the belt 22. The operator will slightly pull the belt 22 outwardly to release the clamping member 88 as will now be described.

As the operator pulls the belt 22 outwardly, the reel 44 will rotate slightly counterclockwise from its FIG. 4 position to its FIG. 6 position. This again will shift the slide 66 slightly upwardly and again ratchet the plate 78 and the wheel 84 in a counterclockwise direction as viewed in FIGS. 8 and 9. The one lobe 106 of the wheel 84 will now engage the lobe 98 of the one leg of the clamping member to rotate the clamping member in a clockwise direction about the aligned pivots 90 from its FIG. 9 position toward its FIG. 8 position. The clamping member will rotate through a predetermined arc until the spring 102 moves overcenter and then completes the rotation of the clamping member 88 to its final unclamped position shown in FIG. 8. The belt 22 will thereupon be retracted by the spring 56.

From the immediately foregoing description, it can also be seen that the belt-locking means can be released without unbuckling of the belt 22 from the belt 16 by merely pulling on the belt 22.

Thus the releasable belt-locking means of this invention may be selectively operated by the operator at any time he so desires to either move the clamping member 88 to its clamped position or to its unclamped position. The operator thus has freedom of selection regarding whether or not he desires the belt 22 to be clamped against retraction or to be locked or held against retraction.

If for any reason the slide 66 binds or the plate 78 and wheel 84 do not properly move, and angular finger piece 108 is provided on the clamping member so that the clamping member may be manually released or moved from its clamped position to its unclamped position or moved from its unclamped position to its clamped position.

Thus, this invention provides an improved retractor of the automatic locking type having a selectively operable means for releasably locking the reel-mounted belt against movement in a retracting direction whenever the belt is locked against movement in an extending direction.

I claim:

1. In a seatbelt retractor having support means, reel means rotatably mounted on the support means, belt means mounted on the reel means for extension and retraction relative thereto upon rotation of the reel means in extending and retracting directions relative to the support means, means continually biasing the reel means in a retracting direction, cooperating engageable stop means on the support means and reel means operable to hold the reel means against movement in an extending direction and permit movement in a retracting direction, and means operable upon extension of the belt means from an initial retracted position, subsequent retraction, and subsequent extension to engage the stop means, the combination comprising, clamping means on the support means movable into and out of clamping engagement with the belt means to selectively and alternately hold the belt means against retraction and permit extension thereof or permit movement of the belt means in either direction, and means responsive to the subsequent extension of the belt means after said subsequent retraction thereof for moving the clamping means into clamping engagement with the belt means.

2. In a seatbelt retractor having support means, reel means rotatably mounted on the support means, belt means mounted on the reel means for extension and retraction relative thereto upon rotation of the reel means in extending and retracting directions relative to the support means, means continually biasing the reel means in a retracting direction, cooperating engageable stop means on the support means and reel means operable to hold the reel means against movement in an extending direction and permit movement in a retracting direction, and means operable upon extension of the belt means from an initial retracted position, subsequent retraction, and subsequent extension to engage the stop means, the combination comprising, clamping means on the support means movable into and out of clamping engagement with the belt means to selectively and alternately hold the belt means against retraction and permit extension thereof or permit movement of the belt means in either direction, means responsive to the subsequent extension of the belt means after subsequent retraction thereof for moving the clamping means into clamping engagement with the belt means, and means operable independently of disengagement of the stop means for releasing the clamping means to permit retraction of the belt means.

3. In a seatbelt retractor having support means, reel means rotatably mounted on the support means, belt means mounted on the reel means for extension and retraction relative thereto upon rotation of the reel means in extending and retracting directions relative to the support means, means continually biasing the reel means in a retracting direction, cooperating engageable stop means on the support means and reel means operable to hold the reel means against movement in an extending direction and permit movement in a retracting direction, and means operable upon extension of the belt means from an initial retracted position, subsequent retraction, and subsequent extension to engage the stop means, the combination comprising, clamping means on the support means movable into and out of clamping engagement with the belt means to selectively and alternately hold the belt means against retraction and permit extension thereof or permit movement of the belt means in either direction, means responsive to the subsequent extension of the belt means after said subsequent retraction thereof for moving the clamping means into clamping engagement with the belt means, and means responsive to movement of the belt means in an extending direction during engagement of the stop means for moving the clamping means out of engagement with the belt means.

4. In a seatbelt retractor having support means, reel means rotatably mounted on the support means, belt means mounted on the reel means for extension and retraction relative thereto upon rotation of the reel means in extending and retracting directions relative to the support means, means continually biasing the reel means in a retracting direction, cooperating engageable stop means on the support means and reel means operable to hold the reel means against movement in an extending direction and permit movement in a retracting direction, and means operable upon extension of the belt means from an initial retracted position, subsequent retraction, and subsequent extension to engage the stop means, the combination comprising, clamping means on the support means movable into and out of clamping engagement with the belt means to selectively and alternately hold the belt means against retraction and permit extension thereof or permit movement of the belt means in either direction, and means responsive to movement of the belt means in an extending direction during engagement of the stop means for selectively and alternately moving the clamping means into and out of clamping engagement with the belt means.

5. In a seatbelt retractor having support means, reel means rotatably mounted on the support means, belt means mounted on the reel means for extension and retraction relative thereto upon rotation of the reel means in extending and retracting directions relative to the support means, means continually biasing the reel means in a retracting direction, cooperating engageable stop means on the support means and reel means operable to hold the reel means against movement in an extending direction and permit movement in a retracting direction, and means operable upon extension of the belt means from an initial retracted position, subsequent retraction, and subsequent extension to engage the stop means, the combination comprising, clamping means on the support means movable into and out of clamping engagement with the belt means to selectively and alternately hold the belt means against retraction and permit extension thereof or permit movement of the belt means in either direction, and means responsive to engagement of the stop means for moving the clamping means into clamping engagement with the belt means.

6. In a seatbelt retractor having support means, reel means rotatably mounted on the support means, belt means mounted on the reel means for extension and retraction relative thereto upon rotation of the reel means in extending and retracting directions relative to the support means, means continually biasing the reel means in a retracting direction, cooperating engageable stop means on the support means and reel means operable to hold the reel means against movement in an extending direction and permit movement in a retracting direction, and means operable upon extension of the belt means from an initial retracted position, subsequent retraction, and subsequent extension to engage the stop means, the combination comprising, fixed clamping means on the support means, movable clamping means on the support means movable into and out of engagement with the belt means to selectively and alternately clamp the belt means to against the fixed clamping means or unclamp the belt means from the fixed clamping means and permit movement of the belt means relative thereto, resilient means selectively and alternately holding the movable clamping means in either clamped or unclamped position, and means responsive to engagement of the stop means for moving the clamping means to either position thereof.

7. In a seatbelt retractor having support means, reel means rotatably mounted on the support means, belt means mounted on the reel means for extension and retraction relative thereto upon rotation of the reel means in extending and retracting directions relative to the support means, means continually biasing the reel means in a retracting direction, cooperating engageable stop means on the support means and reel means operable to hold the reel means against movement in an extending direction and permit movement in a retracting direction, and means operable upon extension of the belt means from an initial retracted position, subsequent retraction, and subsequent extension to engage the stop means, the combination comprising, fixed clamping means on the support means, movable clamping means on the support means movable between clamped and unclamped positions with respect to the fixed clamping means, the movable clamping means in clamped position holding the belt means against the fixed clamping means and against movement in a retracting direction, the movable clamping means in unclamped position permitting movement of the belt means relative to the fixed clamping means, means selectively and alternately holding the movable clamping means in clamped or unclamped position, cam and cam follower means for moving the movable clamping means between the positions thereof, and means responsive to engagement of the stop means for moving the cam and cam follower means relative to each other.

PO-1050
(5/69)

UNITED STATES PATENT OFFICE
CERTIFICATE OF CORRECTION

Patent No. __3,598,335__                Dated __August 10, 1971__

Inventor(s) __Gerald Seeger__

It is certified that error appears in the above-identified patent and that said Letters Patent are hereby corrected as shown below:

Column 1, line 26, after "teeth" insert -- and into engagement with the next successive pair of ratchet teeth --.
    line 61, after "thereon" insert -- and --.

Column 2, line 12, "conventional" should read -- conventionally --.
    line 42, "aperture" should read -- apertured --.
    line 43, "The peripheries of the" should be deleted.
    line 44, "plates 42 to provide a reel 44." should be deleted.
    line 55, "bushing" should read -- bushed --.

Column 4, line 8, "release" should read -- released --.
    line 40, "release" should read -- releases --.
    line 63, after "belt" insert -- in --.

Column 6, line 7, after "after" and before "sub-" insert -- said --.
    line 38, "thereof" should read -- thereto --.

Column 7, line 19, "to" should be deleted.

Signed and sealed this 29th day of February 1972.

(SEAL)
Attest:

EDWARD M. FLETCHER, JR.
Attesting Officer

ROBERT GOTTSCHALK
Commissioner of Patents